Nov. 18, 1941.   H. G. BUSIGNIES ET AL   2,263,377
SYSTEM FOR INDICATING THE DIRECTION OF PROPAGATION OF
ELECTROMAGNETIC WAVES
Filed Oct. 8, 1938    2 Sheets-Sheet 1

INVENTORS
H. G. BUSIGNIES - F. BAC.

BY E. D. Phinney
ATTORNEY

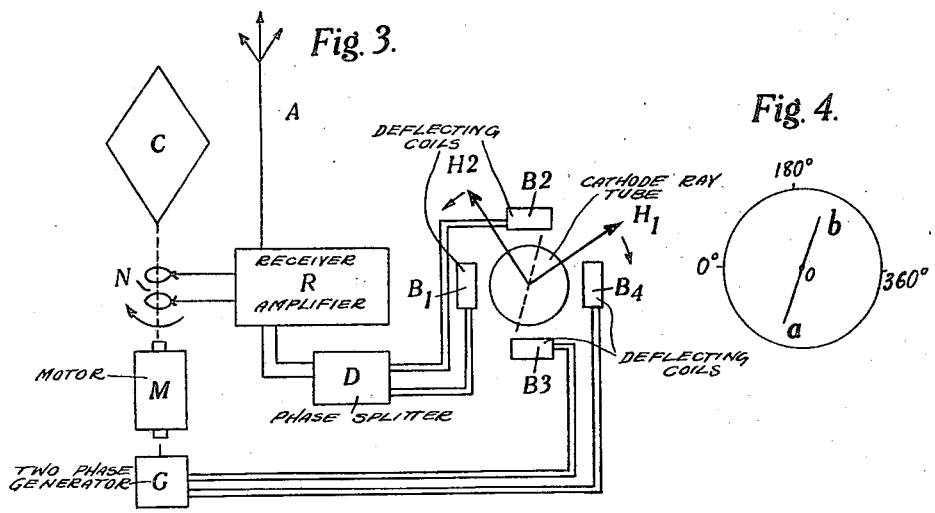
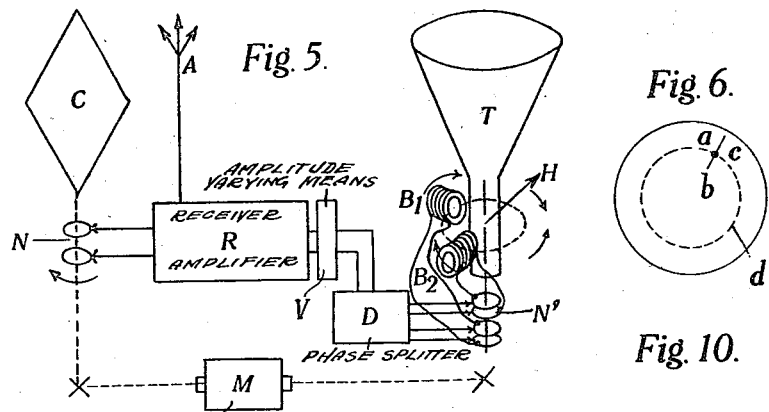
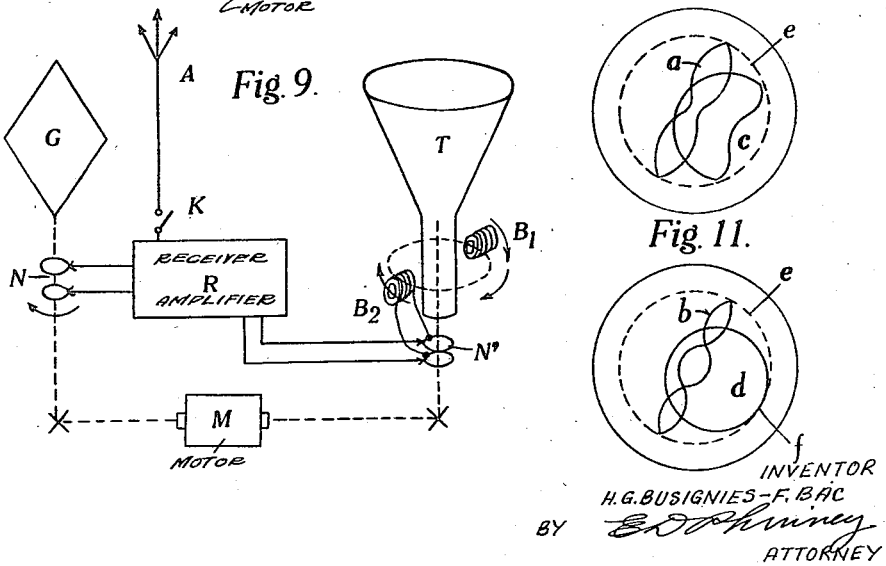
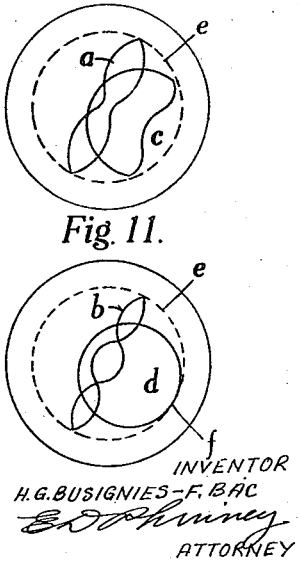

Patented Nov. 18, 1941

2,263,377

UNITED STATES PATENT OFFICE 2,263,377

SYSTEM FOR INDICATING THE DIRECTION OF PROPAGATION OF ELECTROMAGNETIC WAVES

Henri Gaston Busignies and Fernand Bac, Paris, France, assignor to International Standard Electric Corporation, New York, N. Y.

Application October 8, 1938, Serial No. 233,966
In France November 6, 1937

8 Claims. (Cl. 250—11)

The present invention relates to systems for indicating the direction of propagation of waves, for example, electro-magnetic waves, and in particular to such systems with instantaneous direct reading employed for the bearings of electro-magnetic wave transmitting stations.

It is one of the objects of the invention to provide improved devices sensitive to the direction of propagation of waves permitting the bearings of transmitting stations to be obtained automatically in a continuous and instantaneous manner, particularly those transmitting sets of this type which transmit in an intermittent manner, or for a very short time.

In accordance with one aspect the invention provides systems for indicating the direction of propagation of waves comprising a rotating wave collector constituted either of one or more rotating frames, or by a set of fixed aerials of the Adcock type with frames, or others, connected to a revolving finder, means for detecting and amplifying the received signals, means for applying the current thus detected and amplified to an indicator device such as a cathode ray oscillograph in the form of a rotating field, for example, by transforming said current into polyphase current, and means governed by the phase of the output current of the amplifier in order periodically to interrupt at the frequency of the rotation of the directional aerial, or of the finder, the said polyphase currents so as to eliminate the indications supplied by the rotating field, and to produce a periodic modification of said indication permitting a fresh indication to be obtained supplying the desired direction.

In a modification of this aspect, means are provided in order that the current which is detected and amplified should only be applied on the indicator device after transformation into diphase currents during a very brief time of the rotation of the wave collector or finder, the instant of the application of these currents being controlled by the phase of the output current of the detector amplifier, in such a way as only to obtain on the screen of the indicator apparatus the useful portion of the indication.

In accordance with another aspect, the invention provides means for the application to an indicator device such as a cathode ray oscillograph associated with a rotating collector of a first rotating field whose phase depends upon the position of the transmitter in relation to the aerial system, these means comprising a device for the transformation of monophase current into polyphase current, and means for the application on the said indicator device of a second field rotating in fixed phase, and in an opposite direction of rotation to the first field, this second rotating field being realised by means of a device in synchronism with the means of operating the aerial system used.

In accordance with yet another aspect the invention provides means to produce from the output of the detected current originating from a rotating collector system, a rotating field applied to an indicator device and means to rotate in the opposite direction and at the same speed as the rotating field, the original position of the phases of the said field in such a way as to obtain a fixed indication on the indicator apparatus. Methods may also be provided for the periodic variation of the amplitude of the rotating field in such a manner as to obtain an indication which is no longer dotted but linear.

In accordance with another aspect of the invention, two elements rotating at the same speed as the collector system used, are arranged around the frame, means being provided to affect a periodic change in the current detected and amplified originating from the collector system of one or other of these elements in such a way as to obtain two indications which are quasi-simultaneous, the off-set of which supplies the desired indication.

In accordance with yet another aspect of the invention, a system enabling the obtainment of the direction of a transmitter station may comprise a rotating collecter system, a detector amplifier receiving the currents created in the said collector system, an indicator apparatus controlled by the output currents of the amplifier, and means to create a rotating field turning in synchronism with the rotation of a directional aerial system, this rotating field being modulated in such a way as to obtain a characteristic indication on the indicator apparatus and being intermittently modified to provide a sense-determining indication on the said indicator apparatus.

In accordance with another characteristic of the invention, the rotating field can be produced by means of a permanent field element produced around the indicator at the actual speed of rotation of the collector system, and the output current of the amplifier can be transmitted in another element rotating at the same speed and in a diametrically opposite direction or amalgamated with the element of the permanent field in such a manner as to create a resultant field which is modulated.

The invention will be described by way of illustration in its application for the reception of electro-magnetic waves such as a radio-goniometrical reception, but it appears that it can easily be used in other fields and/or with wave reception other than electro-magnetic.

A certain number of embodiments incorporating the characteristics of the invention is represented by way of example on the attached designs. These embodiments mainly use a cathode ray oscillograph as an indicator device, but it is clear that any other device having a luminous spot or other indicator organ which does not present inertia may be used.

The various characteristics will be explained in detail in the following description of the said embodiments. In the drawings:

Fig. 3 represents another embodiment of the indicator device, and Fig. 4 represents the indication obtained;

Fig. 5 represents a device using rotating deflector elements for the indicator apparatus, and Fig. 6 the indication obtained.

Fig. 9 represents an embodiment of the indicator device in which one of the two rotating elements consists in an electro-magnet; and Figures 10 and 11 represent the two types of possible indication corresponding to this device.

Figure 1:
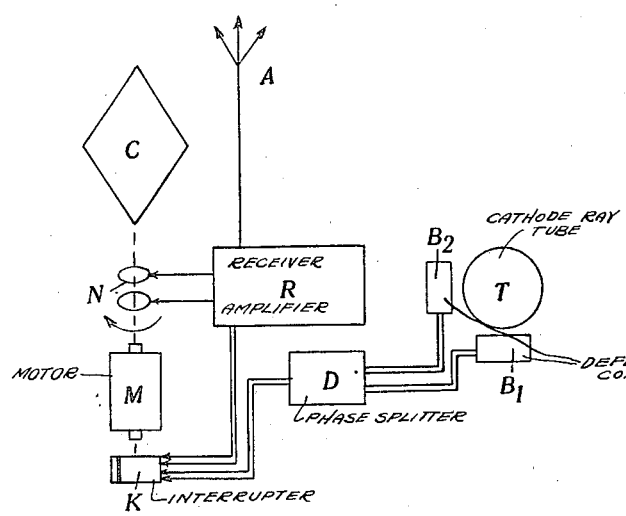
Fig. 1 represents a device including a single collector and means to produce a clear indication of the screen of the indicator, and this indication is shown on Fig. 2.

The embodiments illustrated comprise a single rotating collector such as a frame, or finder, or an arrangement of angularly disposed fixed aerials connected to a rotating finder. The system diagrammatically shown in Fig. 1 comprises a rotating collector, or frame C, operated by a motor M. This frame C is connected electrically, for example, by means of revolving ring contacts diagrammatically shown in N to the receiver amplifier R to which there is also connected permanently an antenna, or fixed non-directional aerial A. The output of the amplifier receiver R can be applied to the deflector elements of an indicator apparatus such as a cathode ray oscillograph, for example, on the external deflecting coils B1 and B2 of the said oscillograph T. On the screen of the oscillograph there will then appear a cardioid indication in consequence of the detected periodic current. By eleminating from this current the continuous component in any known manner, an alternating monophase current which is substantially sinusoidal is obtained, the phase of which is a function of the position of the receiver with relation to the wave collector.

Figure 2:
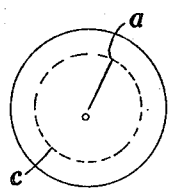

This monophase current is in accordance with the characteristic of the invention transformed into polyphase currents, for example, diphased by any suitable means D. These disphase currents will then be applied as indicated to the mutually perpendicular coils B1 and B2 producing a deviation of the cathode ray of the device T, or on the deflector plates themselves of the said device, or by combining the two series of elements so as to establish a rotating field. Under the action of this rotating field the spot describes a circle which appears on the screen as indicated by the dotted circumference c on Fig. 2.

In order to obtain the desired indication in accordance with yet another characteristic of the invention, this rotating field is interrupted periodically for a very short time, whilst suppressing the output current of the amplifier at each rotation of the frame, or the finder. This interruption may be realised, for example, by means of the interrupter K mounted on the axle of the motor M, operating the collector and placed in the electric circuit connecting the amplifier R to the circuit D of the transformation of the monophase current into diphase. This interrupter is keyed in an invariable position on the common shaft after being adjusted. At each interruption of the current the spot comes to the centre of the screen again following a line which is markedly radial, such as oa, Fig. 2. The position of the spot on the screen varies with respect to the loop position in accordance with the location of the transmitting station which causes a change in the phase of the detected envelope with respect to a reference direction. As a consequence the position of the ray radially on the screen depends upon that of the spot at the moment of interruption, and in consequence upon the phase of the output current of the amplifier. The position of this radial line oa can, therefore, determine the direction of the transmitter on a graduated scale around the screen, or carried by the screen. The line being radial there is, accordingly, no uncertainty of 180°.

It is clear that instead of applying in a continuous manner the current on the deflector elements it is possible to provide the interrupter K in such a manner that this same current is only applied periodically in a transitory manner. The result is that the indication oa exists only in the continuous normal indication in the form of a circle.

Another device incorporating the characteristics of the invention is shown on Fig. 3. On this figure, as in the preceding figure, a rotating collector C is operated by a motor M and connected by contacts N to the amplifier receiver R which is also connected permanently to a non-directional antenna A. A device enabling the transformation of the monophase output current of the device R into diphase currents is equally provided and shown as D on the drawing. The diphase currents are applied on the deflector elements B1 and B2 of a cathode ray tube T and produce a rotating field H1 whose phase depends upon the position of the transmitter with relation to the aerial. An alternating current generator G keyed on the shaft of the motor M is arranged to feed the auxiliary deflector elements such as the coils B3 and B4, and thus to generate a rotating field H2 of fixed phase rotating in the opposite direction from H1. The cathode spot accordingly describes on the screen of the tube T under the influence of the two fields H1 and H2 a curve which, when the two fields are equal, consists of a straight line such as aob (Fig. 4), bisecting the angles of the instantaneous positions of the two rotating fields.

Another method of obtaining the direction of propagation of an incident wave is given on Fig. 5. The device which incorporates this means of the invention comprises the same elements rotating collector C, slip rings N, amplifier receiver R, antenna A, driving motor of the collector M, transformation devices for the monophase output current into diphase current, cathode ray tube used as indicator T, having as deflector elements external coils B1 and B2 at 90° respectively, so as to create a magnetic field which rotates in a certain direction.

In accordance with a characteristic of the invention, these field elements are arranged to rotate around the tube T in synchronism with the collector C (the mechanism of the connection of the motor M and the coils being shown only by dotted lines for the sake of simplicity of the drawing). These elements therefore rotate at the same speed as the field H, but in the opposite direction to this. The indication on the oscillograph screen which will be a circle as shown by the dotted line $d$, or if the elements are fixed, only produces itself on this circle as a fixed location for a determined reception in the form of an immovable spot $a$, the radius on the screen passing through this fixed point $a$ serving to determine the direction of the transmitter station.

In order to avoid the repeated production of the cathode spot on the luminescent screen producing a deterioration of the said screen at this place, the spot is, in accordance with a feature of the invention, led to vary from one part or another of its fixed position, for example in accordance with a radial line $bc$ (Fig. 6). This movement can be obtained by periodically varying the amplitude of the rotating field by any suitable means V.

Figure 7:
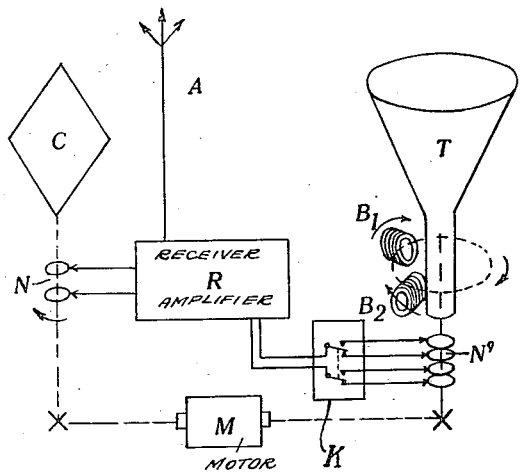
Fig. 7 is yet another embodiment and Fig. 8 the indication realised.

Another means yet of realising an indicator of the direction of the wave propagation is diagrammatically shown on Fig. 7. This device does not include the transformation of monophase current into diphase current in the output circuit of the amplifier R, associated with a frame or rotating finder C, operated by a motor M and a fixed vertical antenna A. Two coils or external deflector elements B1 and B2 are arranged around the cathode ray tube T, or the like, and are mechanically mounted so as to be able to rotate around the said tube. The mechanical parts have been omitted to make the figure simpler, and for the same reason the electric connections of the said coils at the rotating contact wipers are diagrammatically shown as N'. A switch interrupter K is provided in the connection of the amplifier R to the coils B1 and B2. The two coils are rotated in synchronism with the collector C as indicated by the arrows.

Figure 8:
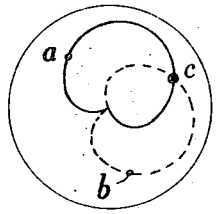

The first coil B1 considered alone and moved around the tube T in synchronism with the collector gives on the oscillograph screen a curve like that of the cardioid A shown on Fig. 8, having radial components due to amplitude variations, and circumferential components by reason of its rotation. The bearing of the transmitter station can be deduced directly from this curve $a$ and without the uncertainty of 180°, but with an inaccuracy due to the fall of the curve in these points of maximum and minimum directivity.

The use of the second coil B2 causes to appear on the screen a second curve $b$ as a cardioid similar to the first, but displaced by the same angle as that between the coils. If the switching of the coils produced by the interrupter switch K is sufficiently rapid, the persistence of the image on the screen will cause the two cardioids to appear permanently and the intersection of the two curves will supply a point $c$ enabling a precise reading of the direction sought.

An automatic radio goniometrical device with instantaneous reading using other characteristics of the invention is shown in Fig. 9.

A frame or rotating collector C is associated electrically with a receiver amplifier R which is itself associated with a vertical antenna A through the intermediary of an interrupter K, normally open, the output of the amplifier R being directly connected to a deflection coil B2 rotating around the cathode ray tube T in synchronism with the collector C through the intermediary of the common driving motor. An electro-magnet with a permanent field, or a magnet B1 is equally placed in synchronism with the collector C around the cathode ray tubes in such a manner as to produce a circular development of the time basis. For purposes of simplicity of the drawing the mechanical coupling components between the different elements have not been shown on this drawing either. The coil B2 and the electro-magnet or magnet B1 can be either diametrically opposed, or amalgamated. The actual indication of the electro-magnet or magnet alone is a circle such as shown by the dotted line as $e$ on Figures 10 and 11. According to the amplitude of the signal received a curve such as $a$, Fig. 10, or $b$, Fig. 11 would be obtained by the combination of the two diagrams due to the elements B1 and B2 on the luminous screen because of the radial displacement caused by amplitude variations. These indications show the form of the symmetrical curves giving the direction of the station in an accurate manner, but not its sense. In order to get rid of this uncertainty it is sufficient to add the action of the vertical antenna A by closing the switch K momentarily, either manually or automatically. The indications then take form, such as $c$ and $d$ which, because of the phase relation between currents from A and G are to the right or left with regard to their principal portion with relation to curves $a$ and $b$. The position of these curves $c$ or $d$ with relation to the curves $a$ or $b$ respectively gives the direction of the indication sought. It should be mentioned that curves such as $e$ and $d$ will be sufficient to give an indication of the transmitting station by their common tangent at $f$, but such an indication will not be accurate, the points of the tangents of the two circles being badly defined in practice.

It is clear that numerous installations can be made to the devices described and shown without departing from the scope of the invention.

What is claimed is:

1. Direction finder comprising a receiver system, a rotatable pick-up coil coupled to the input of said system, means for converting the output current of said system into diphased currents, a cathode ray tube indicator and deflector elements therefor, connections for applying the diphased currents to said deflector elements to produce a rotating field in said indicator and means for rotating said deflector elements in synchronism with said rotating field but in reverse direction thereto whereby a stationary luminous-spot indication of the direction of picked-up wave energy is provided in said indicator.

2. Direction finder according to claim 1, further comprising means to periodically vary the amplitude of said rotating field to convert said luminous-spot indication into a radial-line indication.

3. Direction finder according to claim 1, including a non-directional aerial permanently connected to said receiving system to suppress the 180° ambiguity of indications.

4. A radio direction finder comprising a radio receiver system, a rotatable pick-up coil coupled to the input of said receiving system, means for deriving a variable amplitude control potential from the output of said receiver, a cathode ray tube having a cathode ray beam, a screen and deflecting elements, means for applying said variable amplitude potential to said elements to control radial displacement of said beam on said screen, means for controlling said elements to produce a rotary force tending to rotate said beam in one direction at a given speed, and other means operatively associated with said beam tending to rotate said beam in a direction opposite to said one direction, and at substantially the same speed.

5. A radio direction finder according to claim 4 wherein said other means comprises a driving means rotating said deflecting elements in synchronism with the rotation of said rotatable pick-up coil.

6. A radio direction finder according to claim 4, wherein said means for controlling said elements comprises a phase splitting means in the output of said receiver, and means for applying said split phase energy to said elements.

7. A radio direction finder comprising a radio receiver system, a rotatable pick-up coil coupled to said receiver system, means for rotating said pick-up coil, means for deriving a variable amplitude control potential from said receiver, a cathode ray tube having a cathode ray beam, a screen, and at least one deflecting element, means for applying said variable amplitude potential to said deflecting element to produce a variable radial displacement of said cathode ray beam on said screen, and means for rotating said deflecting elements in timed relation with rotation of said rotary pick-up coil.

8. A radio direction finder comprising a radio receiver system, a rotatable pick-up coil coupled to said receiver system, means for rotating said pick-up coil, means for deriving a variable amplitude control potential from said receiver, means for splitting the phase of said variable control potential, a cathode ray tube having a cathode ray beam, a screen and deflecting elements, and means for applying said split phase variable amplitude energy to said elements, whereby said variation in amplitude controls lateral displacement, and said split phases control the angular displacement of said cathode ray beam on said screen.

HENRI GASTON BUSIGNIES.
FERNAND BAC.